United States Patent [19]

Miura

[11] Patent Number: 4,922,477
[45] Date of Patent: May 1, 1990

[54] OPTICAL HEAD UNIT

[75] Inventor: Masafumi Miura, Osaka, Japan

[73] Assignee: NEC Home Electronics Ltd., Osaka, Japan

[21] Appl. No.: 200,052

[22] Filed: May 27, 1988

[30] Foreign Application Priority Data

May 30, 1987 [JP] Japan ............................ 62-84602[U]
May 31, 1987 [JP] Japan ............................ 62-84840[U]

[51] Int. Cl.⁵ ............................ G11B 7/12; G02B 7/02
[52] U.S. Cl. .................................... 369/221; 369/244; 250/201.5; 350/247
[58] Field of Search ............... 369/215, 219, 220, 221, 369/222, 226, 228, 44, 45, 244, 249, 251, 256; 360/106; 250/201 DF; 350/247

[56] References Cited

U.S. PATENT DOCUMENTS

| | | | |
|---|---|---|---|
| 4,570,249 | 2/1986 | Malissin et al. | 369/219 |
| 4,740,946 | 4/1988 | Yumura et al. | 369/219 |
| 4,766,583 | 8/1988 | Oinoue et al. | 369/44 |
| 4,798,447 | 1/1989 | Jansen et al. | 369/44 |
| 4,823,219 | 4/1989 | Ueda et al. | 369/220 |

FOREIGN PATENT DOCUMENTS

| | | |
|---|---|---|
| 55-80834 | 6/1980 | Japan . |
| 58-122630 | 7/1983 | Japan . |
| 58-159249 | 9/1983 | Japan . |
| 59-140646 | 8/1984 | Japan . |
| 59-148153 | 8/1984 | Japan . |
| 60-131642 | 7/1985 | Japan . |
| 61-137229 | 6/1986 | Japan . |
| 61-168179 | 7/1986 | Japan . |

Primary Examiner—Steven L. Stephan
Attorney, Agent, or Firm—Cushman, Darby & Cushman

[57] ABSTRACT

In an optical head unit, a magnetic circuit is provided on the chassis base of a housing in such a manner that it extends parallel to a radial direction of a disk. A head base is provided over the magnetic circuit in such a manner that it can be reciprocated in the radial direction of the disk. An objective lens holder is supported by the head base in such a manner that the objective lens holder is swingable in the radial direction of the disk through an elastic supporting member such as an elastic hinge and in a focusing direction perpendicular to the surface of the disk through an elastic supporting member such as a leaf spring. A head feeding coil secured to the head base and a focusing coil and a tracking coil mounted on the objective lens holder are coupled to the magnetic circuit in such a manner that they are movable in the radial direction of the disk.

4 Claims, 10 Drawing Sheets

OPTICAL HEAD UNIT

BACKGROUND OF THE INVENTION

The present invention relates to an optical head unit for use in an optical disk device such as a magneto-optic disk or CD-ROM. More particularly, the invention relates to the construction of a movable section in a division-type optical system in which the optical system is divided into a stationary section and a movable section.

In one example of a conventional optical head unit, the optical head is linearly reciprocated in the radial direction of the optical disk with a linear motor. An optical head unit of this type, having a good head feeding response, can achieve high speed access operations.

Recently, an optical head unit of the division-type optical system has been proposed in which the optical system of the optical head is divided into a stationary section and a movable section so that the number of optical components for the movable section can be reduced as much as possible so as to minimize the weight of the movable section.

However, the optical head unit still has a large number of components and is intricate in construction because the magnetic circuit of the linear motor used for driving the optical head radially of the disk and the magnetic circuit of the objective lens actuator used for driving the objective lens in the focusing and tracking directions are provided separately from each other.

Furthermore, in the conventional optical head unit, since the movable section includes the magnetic circuit for the objective lens actuator, the movable section still has a large weight, thus obstructing the further improvement of high speed access operations.

SUMMARY OF THE INVENTION

In view of the foregoing, an object of the present invention is to provide an optical head unit which has a smaller number of components, simpler construction, smaller weight, and higher access speed than a conventional optical head unit.

Another object of the invention is to provide an optical head unit which has a smaller thickness than the conventional optical head unit.

The foregoing and other objects of the invention have been achieved by the provision of an optical head unit which, according to the invention, comprises: a magnetic circuit provided on a chassis base of a housing and arranged parallel to the radial direction of a disk; a head base mounted over the magnetic circuit in such a manner that the head base can be reciprocated in the radial direction of the disk; an objective lens holder supported by the head base in such a manner that the objective lens holder is rockable in the radial direction of the disk through a first elastic supporting member such as an elastic hinge and in a focusing direction perpendicular to the surface of the disk through a second elastic supporting member such as a leaf spring; a head feeding coil secured to the head base; and a focusing coil and a tracking coil mounted on the objective lens holder, the head feeding coil, focusing coil and tracking coil being coupled to the magnetic circuit in such a manner as to be movable in the radial direction of the disk.

When current is applied to the head feeding coil, a force acts on the coil in the bias magnetic field of the magnetic circuit in such a manner that the head base secured to the coil is moved in the radial direction of the disk. When the focusing coil is energized, a force acts on the coil in the bias magnetic field of the magnetic circuit in such a manner that the objective lens holder secured to the coil is moved in the focusing direction. When the tracking coil is energized, a force acts on the coil in the bias magnetic field of the magnetic circuit in such a manner that the objective lens holder secured to the coil is moved in the tracking direction. Thus, with the single magnetic circuit secured to the chassis base, linear movement of the head base and the focusing and tracking servo operations of the objective lens holder can be achieved.

The above-described optical head unit of the invention may be modified as follows: A magnetic circuit is provided on the chassis base of the housing spaced away from the optical axis of a stationary optical system and parallel to the optical axis, an objective lens holder supported by the head base in such a manner that the center of the objective lens is in alignment with the optical axis and the objective lens holder is rockable in a direction perpendicular to the surface of the disk through an elastic supporting member such as a leaf spring, a head feeding coil is secured to the head base, and a focusing coil and a tracking coil are secured to an arm extending from the objective lens holder. The other arrangement is the same as that of the above-described optical head unit. In the modification, the focusing coil and the tracking coil are provided on one side of the objective lens holder spaced away from the objective lens holder. Therefore, the optical path of the optical system in the optical head unit is established on one side of the magnetic circuit. The objective lens holder is provided on the one side of the magnetic circuit in such a manner that the center of the objective lens is aligned with the optical axis of the optical system.

The nature, principle and utility of the invention will become more apparent from the following detailed description when read in conjunction with the accompanying drawings.

DESCRIPTION OF THE PREFERRED EMBODIMENTS

Preferred embodiments of the invention will be described with reference to the accompanying drawings.

A first example of an optical head unit constructed according to the invention, as shown in FIGS. 1 through 4, is composed of a division-type optical system in which the optical system forming the optical head is divided into a stationary section 1 and a movable section 2.

Figure 1:
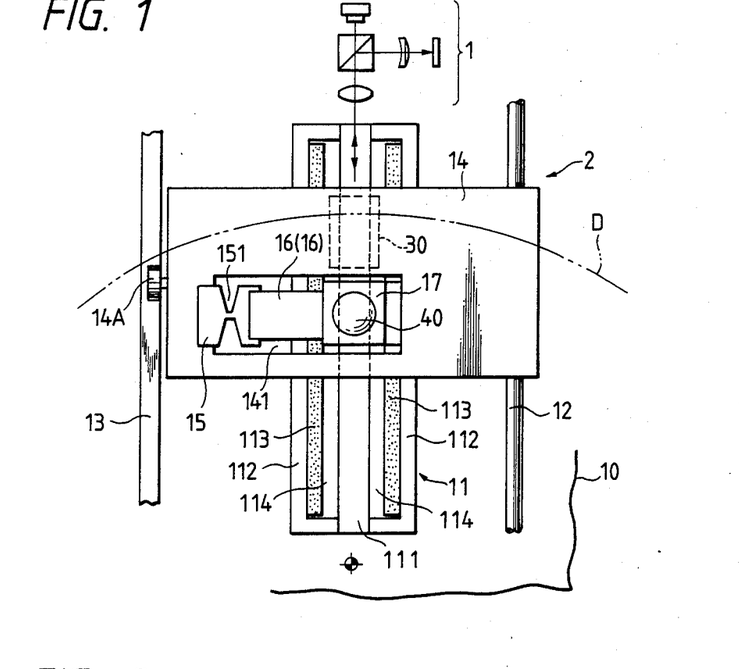
FIG. 1 is a plan view showing the arrangement of a first example of an optical head unit according to the invention.

A magnetic circuit 11 is arranged on a chassis base 10 in such a manner that it extends parallel to the radial direction of a disk D; more specifically, the central axis of the magnetic circuit 11 is parallel to the radial direction.

Figure 3:
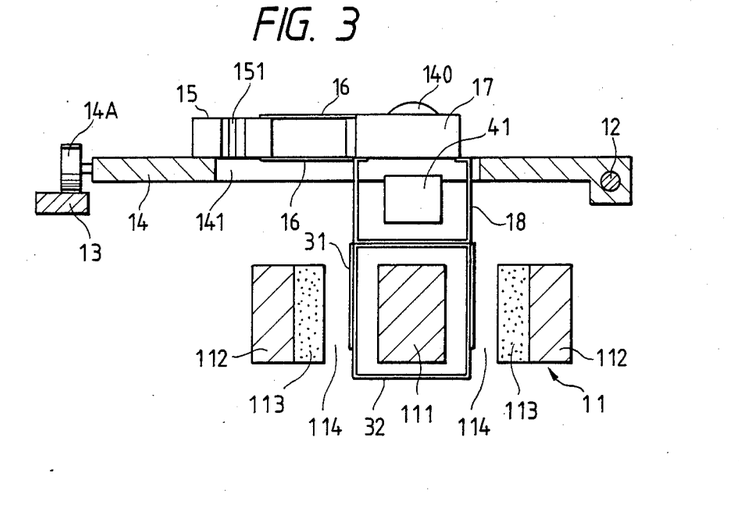
FIG. 3 is a sectional front view of the movable section in the optical head unit.

The magnetic circuit 11 is made up of a central yoke member 111, U-shaped yoke members 112 arranged on both sides of the central yoke member 111, and magnets 113 provided on the inner walls of the respective U-shaped yoke members 112 in such a manner that gaps 114 are formed between the central yoke 111 and the U-shaped yoke members 112 so that a bias magnetic field is formed in the gaps 114.

Figure 2:
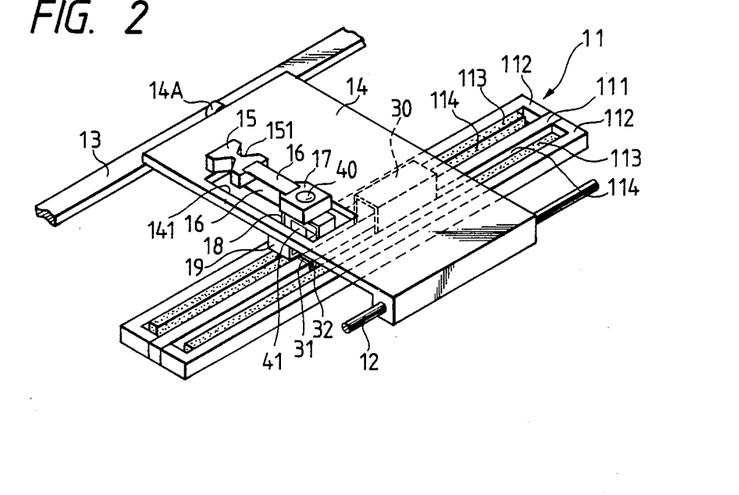
FIG. 2 is a perspective view showing a movable section in the optical head unit of FIG. 1.

A guide shaft 12 and a guide rail 13 are provided on both sides of the magnetic circuit 11 and above the latter in such a manner that the guide shaft 12 and the guide rail 13 are parallel to the magnetic circuit 11 and accordingly each other. A head base 14 has one side portion which is slidably mounted on the guide shaft 12, and a roller 14A is rotatably supported on the other side portion of the head base 14. The roller 14A is placed on the guide rail 13. That is, the head base 14 is supported so that it is movable in the radial direction of the disk guided by the guide shaft 12 and the guide rail 13.

Figure 4:
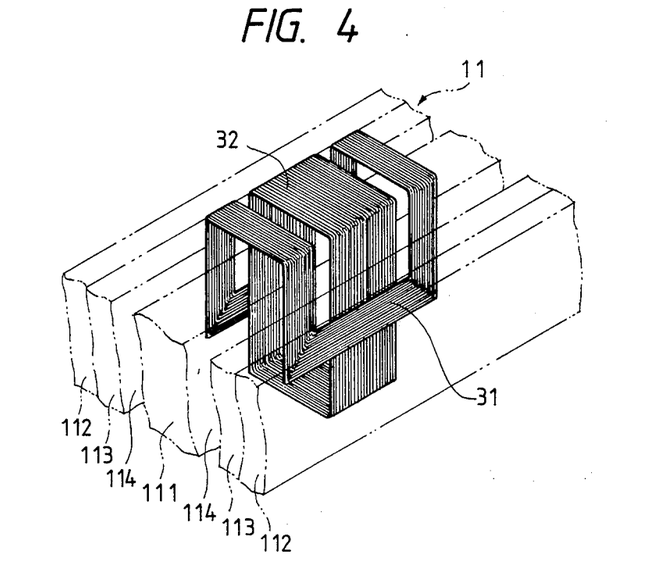
FIG. 4 is an enlarged perspective view showing servo coils in the movable section.

A head moving coil 30 is mounted on the lower surface of the head base 14. The coil 30 is wound on the central yoke member 111 of the magnetic circuit 11 with a predetermined clearance between the coil and the central yoke member, thus being in the form of a rectangular tube. The coil 30 and the magnetic circuit 11 form a linear motor for driving the head base 14 radially of the disk.

Figure 5:
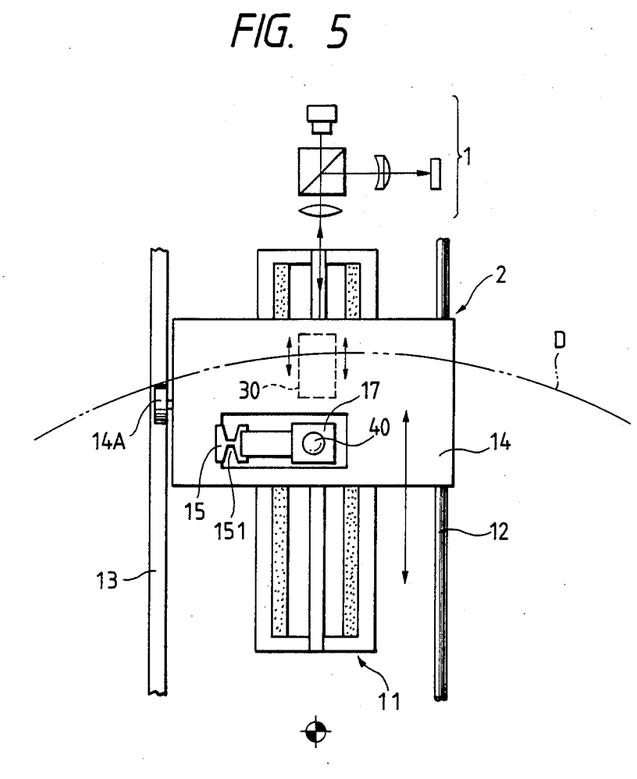
FIG. 5 is an explanatory diagram for a description of the optical head linear feeding operation of the optical head unit according to the invention.

In the head base 14, a control current is applied to the coil 30, which is arranged in the bias magnetic field of the magnetic circuit 11, so that a force acts on the coil 30 to move the latter radially of the disk. As a result, as shown in FIG. 5, the optical head unit is linearly reciprocated in the radial direction of the disk parallel to the guide shaft 12; that is, thread feeding and access feeding of the optical head unit are carried out.

A rectangular hole 141 is formed in the middle portion of the head base 14. One end portion of a supporting member 15 is secured to one side of the rectangular hole 141 thus formed. The supporting member 15 is H-shaped; more specifically it has the one end portion mentioned above, an elastic hinge part 151 at the center, and the other end portion being swingable in the radial direction of the disk through the elastic hinge part 151. A pair of leaf springs 16 are supported at one end by the other end portion of the supporting member 15 in such a manner that they are spaced vertically from each other and are parallel to each other. An objective lens holder 17 is supported at one end from the ends of the leaf springs 16. That is, the objective lens holder 17 is supported so that it is swingable in the radial direction of the disk through the elastic hinge part 151 and in the focusing direction perpendicular to the disk surface through the leaf springs 16 and 16. The objective lens holder 17 holds an objective lens 40.

A rectangular frame 18 is secured to the lower surface of the objective lens holder 17. A focusing coil 31 and a tracking coil 32 are secured to the lower surface of the frame 18. The focusing coil 31 is formed as follows: First, a rectangular flat coil is formed, and then its right and left end portions are bend downward. The right and left end portions thus bent are inserted into the gaps 114 of the respective magnetic circuits 11. The tracking coil 32 is mounted on the central yoke member 111 of the magnetic circuit 11 with a predetermined space between the coil 32 and the member 111.

The head base 14 is further provided with a frame 19 which extends into the frame 18 which, as described above, is secured to the lower surface of the objective lens holder 17. A 45° mirror 41 is installed on the frame 19 located just below the objective lens 40.

On the other hand, the stationary section 1 of the optical head unit is arranged outside of the disk in the radial direction of the disk, which corresponds to the direction of the horizontal central axis of the 45° mirror 41. The stationary section 1 is formed by a main optical system whose optical axis is in alignment with the radial direction of the disk and a light-detecting optical system.

A laser beam outputted by a semiconductor laser in the stationary section 1 is reflected 90° upwardly by the 45° mirror 41 and is applied to the disk D through the objective lens 40. The laser beam reflected from the disk D is returned through the 45° mirror 41 to the light detecting optical system in the stationary section 1 where a focus error signal, a tracking error signal and a reproduction signal are detected.

Figure 6A:
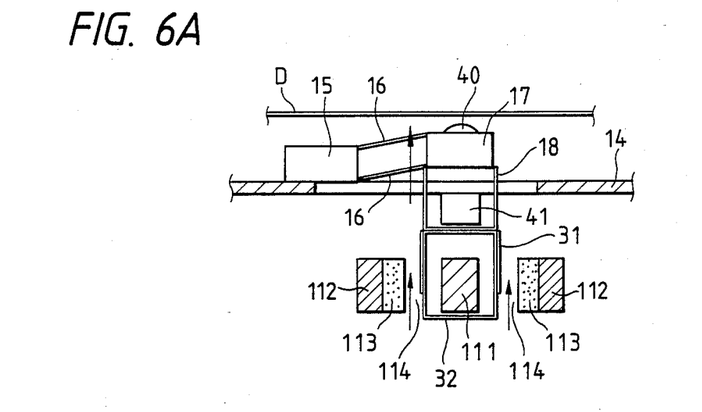
FIGS. 6A and 6B are sectional front views for a description of the movement of an objective lens in the focusing direction.
Figure 6B:
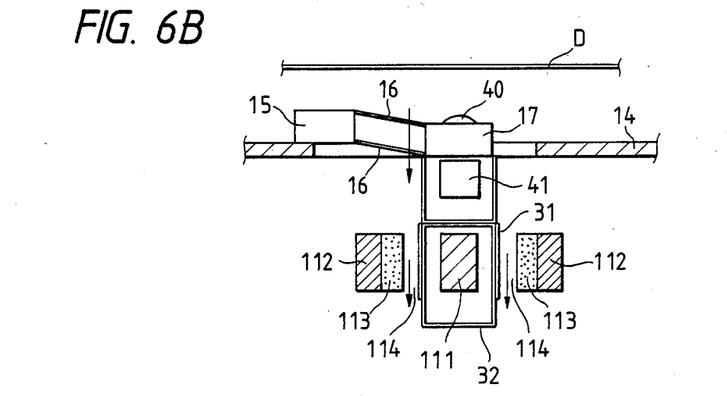
Figure 7A:
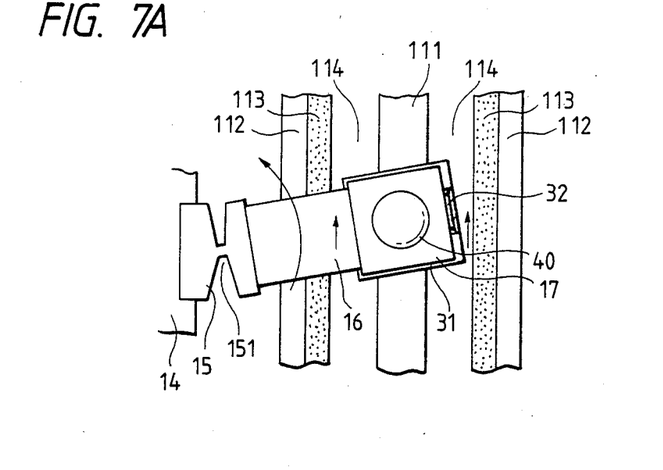
FIGS. 7A and 7B are plan views for a description of the movement of the objective lens in the tracking direction.
Figure 7B:
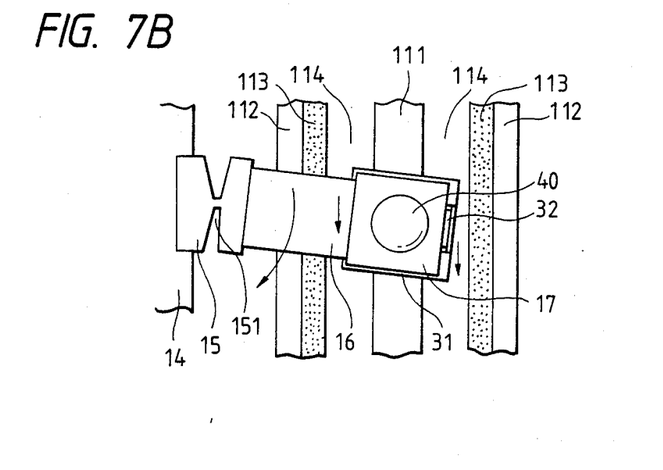

In response to the focus error signal and the tracking error signal, respective control currents are applied to the focus coil 31 and the tracking coil 32. When a control current flows in the focus coil 31, a force acts on the focus coil 31 to move the latter vertically. As a result, as shown in FIGS. 6A and 6B, the leaf springs 16 and 16 are elastically deformed to move the object lens holder 17 vertically so that the laser beam is kept in focus, in the form of a light spot, on the surface of the disk by the objective lens 40. That is, a focusing servo operation is carried out. On the other hand, when a control current is applied to the tracking coil 32, a force acts on the coil 32 in the bias magnetic field to move the latter radially of the disk. As a result, as shown in FIGS. 7A and 7B, the objective lens holder 17 is rocked about the elastic hinge part 151 of the supporting member 15 in the radial direction of the disk so that the objective lens 40 is moved radially of the disk. As a result, the laser beam spot formed on the disk surface by the objective lens 40 is caused to follow the data track; that is, a tracking servo operation is carried out.

As is apparent from the above description, the single magnetic circuit 11 provided on the chassis base 10 serves as a magnetic circuit for a linear motor for linearly moving the optical head and as a magnetic circuit for an objective lens actuator for driving the objective lens 40 in the focusing and tracking directions.

While the above-described first example of a optical head unit of the invention is of the optical system division type, the technical concept of the invention is applicable to an optical head unit in which the optical system is not divided into a stationary section and a movable section.

A second example of an optical head unit according to the invention will be described with reference to FIGS. 8 through 11, in which parts corresponding functionally to those which have been described with reference to FIGS. 1 through 4 are therefore designated by the same reference numerals or characters.

Figure 8:
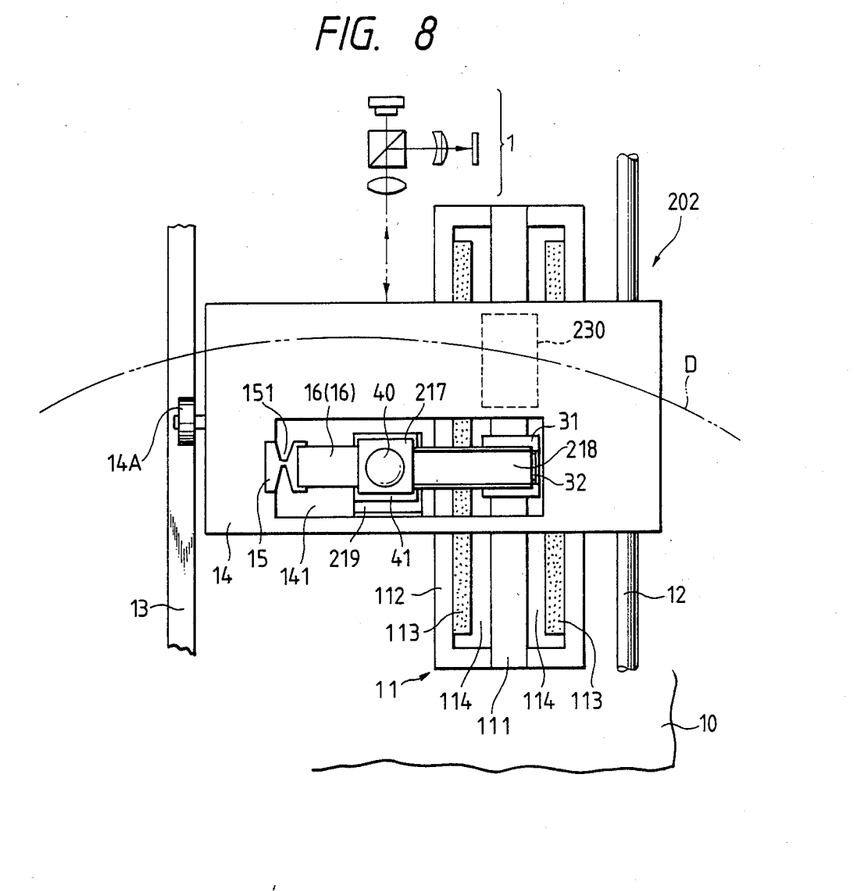
FIG. 8 is a plan view showing the arrangement of a second example of an optical head unit according to the invention.

The second example of the inventive optical head unit differs from the above-described first example in that the objective lens holder 217 is shifted to one side of the magnetic circuit 11 in such a manner that the center of the lens is aligned with the optical axis of the stationary optical system.

Figure 9:
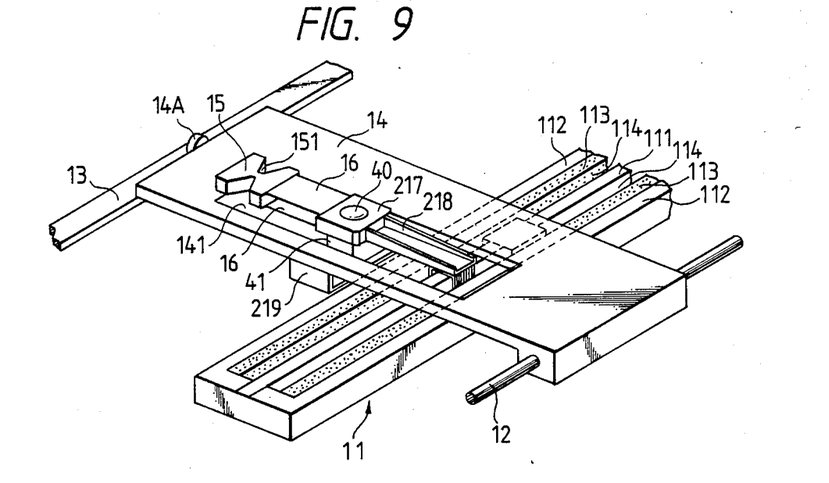
FIG. 9 is a perspective view showing a movable section in the optical head unit of FIG. 8.
Figure 10:
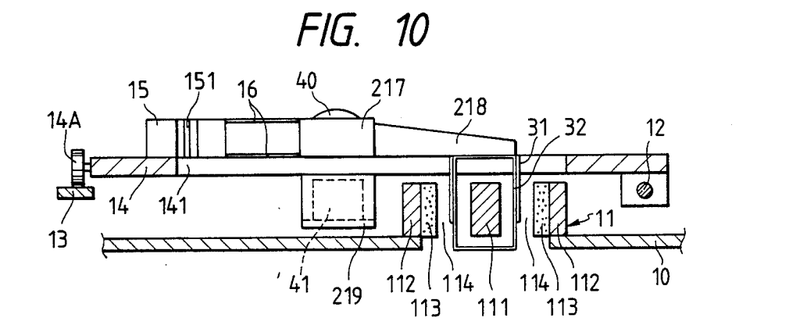
FIG. 10 is a sectional front view showing the movable section of FIG. 9.

The optical axis of the laser beam outputted by the stationary optical system and passed through the objective lens is on one side of the magnetic circuit 11 and parallel to the latter. A head moving coil 230 is provided on the lower surface of the head base 14 so as to move the head radially of the disk in combination with the magnetic circuit.

Figure 11:
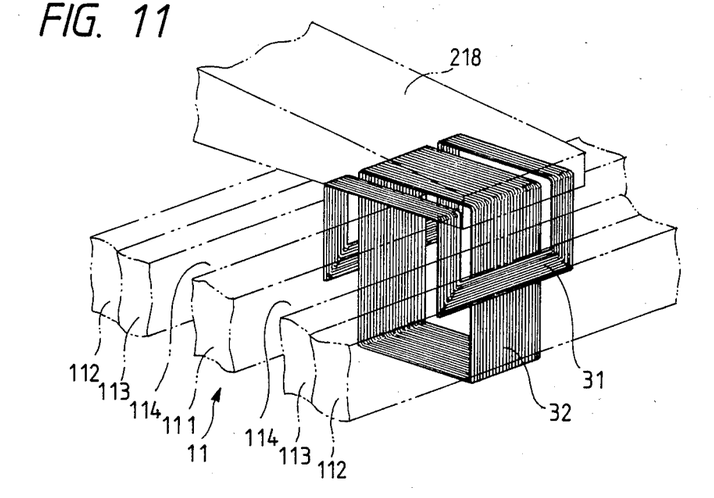
FIG. 11 is an enlarged perspective view showing servo coils in the movable section of FIGS. 9 and 10.

An arm 218 is supported at one end by the objective lens holder 217 in such a manner that it extends in a direction perpendicular to the radial direction of the disk. More specifically, the arm 218 is laid over the magnetic circuit 11 confronting the central yoke member 111. A focusing coil 31 and a tracking coil 32 are mounted on the lower surface of the end portion of the arm 218. Similarly to the case of the first example, the focusing coil 31 is formed by bending downward to the right and left end portions of a rectangular flat coil, and the right and left end portions thus bent are inserted into the gaps 114 of the magnetic circuit. The tracking coil 32, which is in the form of a rectangular tube, is mounted on the central yoke member 111 of the magnetic circuit 11 with a predetermined clearance between the member 111 and the coil 32.

A frame 219 is secured to the head base 14 in such a manner that it extends below the objective lens holder 217. A 45° mirror is mounted on the frame 219 located just below the objective lens 40 and on the optical axis of the stationary optical system provided on one side of the magnetic circuit 11.

The other arrangement of the second example of the optical head unit is the same as that of the first example described above.

As is apparent from the above description, in the second example of an optical head unit according to the invention, the stationary section 1 is arranged outside of the disk in such a manner that the horizontal central optical axis of the laser beam applied to the 45° mirror is made to coincide with the radial direction of the disk.

As described above, the focusing coil 31 and the tracking coil 32 are supported on one side of the objective lens holder 217 through the arm 218, and the optical path of the optical head unit is provided beside the magnetic circuit 11. Therefore, the magnetic circuit 11 can be arranged close to the head base 14, and accordingly the optical head unit made small in thickness.

Figure 12:
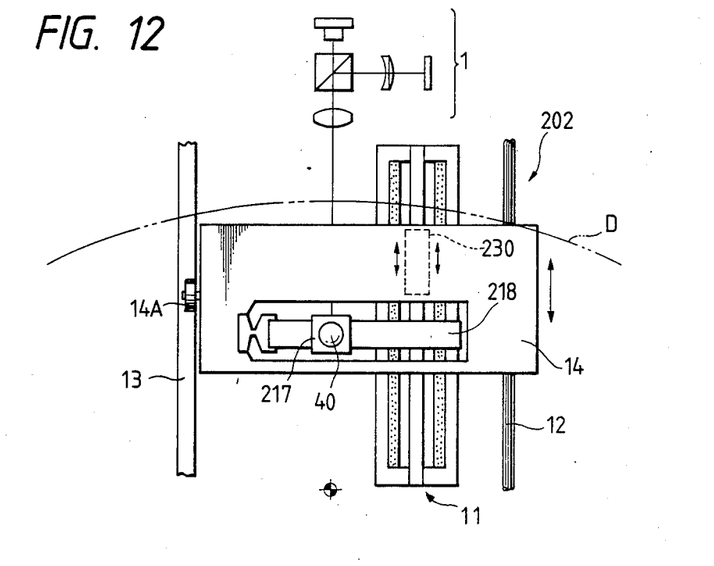
FIG. 12 is an explanatory diagram for a description of an optical head linear feeding operation of the optical head unit shown in FIG. 8.
Figure 13A:
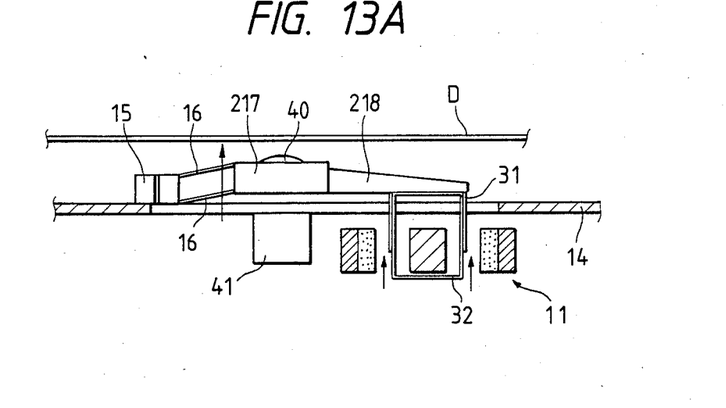
FIGS. 13A and 13B are sectional front views for a description of the movement of an objective lens in the focusing direction in the optical head unit shown in FIG. 8.
Figure 13B:
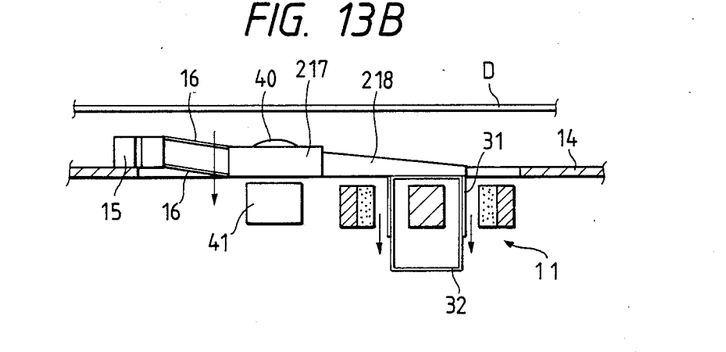
Figure 14A:
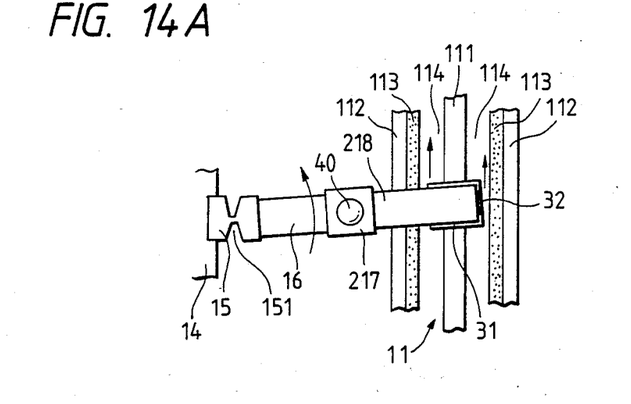
FIGS. 14A and 14B are plan views for a description of the movement of the objective lens in the tracking direction in the optical head unit shown in FIG. 8.
Figure 14B:
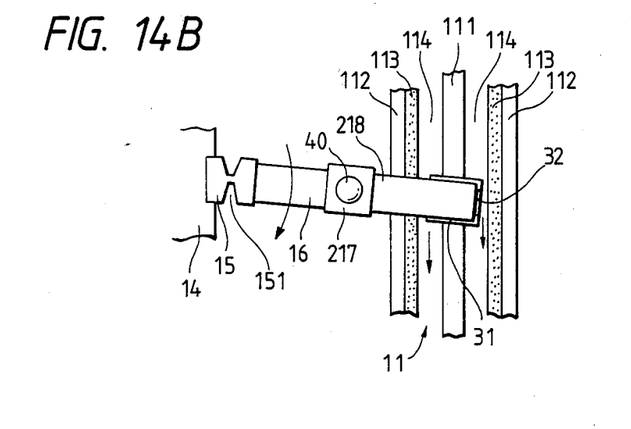

FIGS. 12, 13A, 13B, 14A and 14B are provided for a description of the operation of the second example of the optical head unit according to the invention. In FIG. 12 (corresponding to FIG. 5) reciprocating linear feeding or access feeding of the head base 14 is effected in the radial direction of the disk, that is, parallel to the guide shaft. In FIGS. 13A and 13B (corresponding to FIGS. 6A and 6B), control current is applied to the tracking coil 32 so that the objective lens holder is rocked about the elastic hinge part 151 radially of the disk.

As described above, in the optical head unit according to the invention, a single magnetic circuit is used both for the linear motor for linearly feeding the optical head and for the objective lens actuator for driving the objective lens in the focusing or tracking direction. Therefore, in the optical head unit of the invention, the number of components can be reduced, with the result that the overall construction can be simplified. Furthermore, in the optical head unit of the invention, the magnetic circuit is separated from the movable section, and therefore the movable section is light, thus permitting high speed accessing by the optical head.

Furthermore, according to another aspect of the invention. The optical path of the optical head is arranged beside the magnetic circuit. Therefore, the optical head unit is smaller in thickness than the conventional unit, thus allowing a reduction in the size and thickness of the optical disk device.

what is claimed is:

1. An optical head unit comprising:
   a housing having a chassis base;
   a single magnetic circuit provided on said chassis base in such a manner as to be parallel to a radial direction of a disk to be read by said optical head unit;
   a head base provided over said magnetic circuit in such a manner that said head base can be reciprocated in said radial direction of said disk;
   first and second elastic supporting members;
   an objective lens holder supported by said head base in such a manner that said objective lens holder is rockable in said radial direction of said disk through said first elastic supporting member;
   a head feeding coil secured to said head base; and
   a focusing coil and a tracking coil mounted on said objective lens holder,
   said head feeding coil, focusing coil and tracking coil being coupled to said single magnetic circuit in such a manner as to be movable in said radical direction of said disk.

2. The optical head unit as claimed in claim 1, in which said first elastic supporting member comprises an elastic hinge and said second elastic supporting member comprises a leaf spring.

3. An optical head unit comprising:
   a housing having a chassis base;
   a single magnetic circuit provided on said chassis base in such a manner that said magnetic circuit is spaced away from an optical axis of a stationary optical system and parallel to said optical axis;
   a head base provided over said magnetic circuit in such a manner that said head base can reciprocated along said optical axis;
   first and second elastic supporting members;

an objective lens holder holding an objective lens, said objective lens holder being supported by said head base in such a manner that said objective lens holder is rockable in a direction of said optical axis through said first elastic supporting member, a center of an objective lens held by said objective lens holder is in alignment with said optical axis, and said objective lens holder is rockable in a direction perpendicular to a surface to a disk to be read by said optical head unit through said second elastic supporting member;

a head feeding coil secured to said head base; and
a focusing coil and a tracking coil secured to an arm extending from said objective lens holder,
said head feeding coil, focusing coil and tracking coil being coupled to said single magnetic circuit in such a manner as to be movable in a direction parallel to said optical axis.

4. The optical head unit as claimed in claim 3, in which said first elastic supporting member comprises an elastic hinge and said second elastic supporting member comprises a leaf spring.

* * * * *